United States Patent [19]

Mabuchi et al.

[11] Patent Number: 5,434,460
[45] Date of Patent: Jul. 18, 1995

[54] MINIATURE MOTOR

[75] Inventors: Kazuichi Mabuchi; Makoto Sato, both of Chiba, Japan

[73] Assignee: Mabuchi Motor Co., Ltd., Matsudo, Japan

[21] Appl. No.: 167,771

[22] Filed: Dec. 15, 1993

[30] Foreign Application Priority Data

Dec. 18, 1992 [JP] Japan ............... 4-087056 U

[51] Int. Cl.$^6$ ............................ H02K 11/00
[52] U.S. Cl. ................. 310/71; 310/40 MM; 310/68 C
[58] Field of Search ............ 310/40 MM, 68 C, 71

[56] References Cited

U.S. PATENT DOCUMENTS

| 5,010,264 | 4/1991 | Yamada | 310/68 C |
| 5,140,205 | 8/1992 | Baines | 310/68 C |
| 5,294,852 | 3/1994 | Straker | 310/68 C |

FOREIGN PATENT DOCUMENTS

| 0511776 | 4/1992 | European Pat. Off. . |
| 0544404 | 6/1993 | European Pat. Off. . |
| 1594334 | 7/1981 | United Kingdom . |
| 2222730 | 3/1990 | United Kingdom . |
| 2244868 | 11/1991 | United Kingdom . |

Primary Examiner—Clayton E. La Balle
Attorney, Agent, or Firm—McGlew and Tuttle

[57] ABSTRACT

A miniature motor including a case formed into a bottomed hollow tubular shape and having a permanent magnet fixedly fitted to the inner circumferential surface thereof, a rotor formed of an armature and a commutator, and a case cover engaged with an open end of the case and having brushes making sliding contact with the commutator and input terminals electrically connected to the brushes, in which each of brush arms is formed into an essentially U shape, with one free end thereof having a brush, and the other free end thereof being fitted to the case cover in the vicinity of internal terminals. Each of the internal terminals has an essentially V-shaped connecting part for making contact with the brush arm and is fitted to the case cover in elastically deformed state.

4 Claims, 6 Drawing Sheets

FIG. I
(PRIOR ART)
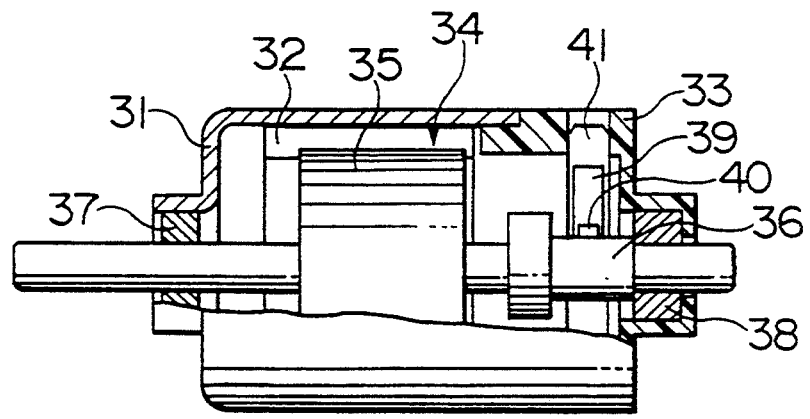
FIG. 2
(PRIOR ART)
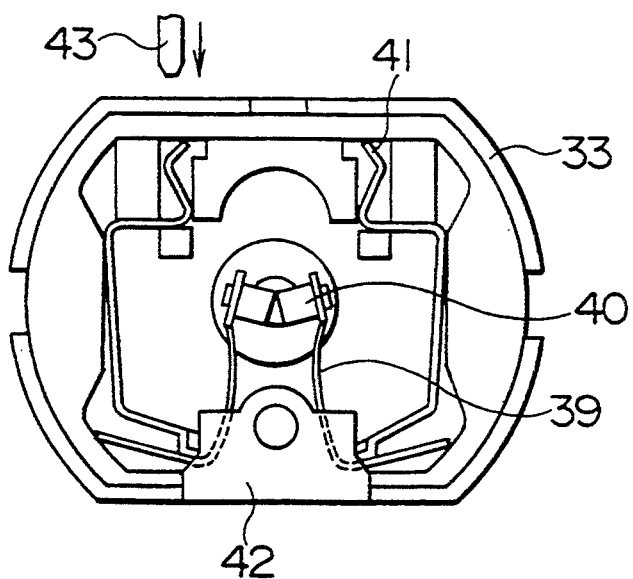

MINIATURE MOTOR

BACKGROUND OF THE INVENTION AND RELATED ART STATEMENT

This invention relates generally to a miniature motor used in audio and video equipment, and automotive electrical components, and more particularly to a miniature motor which can be easily assembled, and has high resistance to vibration and impact, and high reliability in electrical connections.

FIG. 1 is a partially cross-sectional side view illustrating an example of a miniature motor to which this invention is applied. In FIG. 1, reference numeral 31 refers to a case made of a metallic material, such as mild steel, formed into a bottomed hollow tubular shape, and having an arc-segment-shaped permanent magnet 32, for example, fixedly fitted to the inner circumferential surface thereof. Numeral 33 refers to a case cover made of a thermoplastic resin material and formed in such a manner as to be engaged with an open end of the case 31. Numeral 34 refers to a rotor consisting of an armature 35 facing the permanent magnet 32 and a commutator 36, and rotatably supported by bearings 37 and 38 each provided on the case 31 and the case cover 33.

Numeral 39 refers to a brush arm made of an electrically conductive material, formed into a strip shape, having on a free end thereof a brush 40 which makes sliding contact with the commutator 36, and provided inside the case cover 33. Inside the case cover 33 also provided is an internal terminal 41 electrically connected to the brush arm 39 so that power can be fed to the armature 35 from an external d-c power source via the brush arms 39, brushes 40 and commutator 36.

Publicly known examples of this type of miniature motor include GB 2222730, GB 2244868, EP 511776, and GB 1594334.

With the aforementioned construction, as current is fed to the armature 35, rotating force is imparted to the armature 35 placed in a magnetic filed produced by the permanent magnet 32 fixedly fitted to the inner circumferential surface of the case 31, causing the rotor 34 to rotate, driving equipment connected to the rotor 34.

FIG. 2 is an internal end view showing an example of the case cover 33 in FIG. 1. Like parts are indicated by like numerals used in FIG. 1. In FIG. 2, the brush arm 39 is formed in an essentially L shape, fixedly fitted inside the case cover 33 by a holder 42 to force the brush 40 provided on a free end thereof onto the surface of the commutator (not shown) by the resiliency thereof. The internal terminal 41 is made of an electrically conductive strip material, with the contact area thereof making contact with an external power-feeding terminal 43 formed into an essentially S shape, and fitted inside the case cover 33 in such a manner as to cause the lower end thereof to make contact with the brush arm 39 to feed power to the brush arm 39.

FIG. 3 is an inside end view illustrating another example of the case cover 33 in FIG. 1. Like parts are indicated by like numerals used in FIG. 2 above. In FIG. 3, numeral 44 refers to a positive temperature coefficient resistor held in position and interposed between the essentially U-shaped brush arm 39 and the internal terminal 41. The positive temperature coefficient resistor 44 has such a characteristic that the internal resistance thereof sharply increases as the temperature exceeds a certain level (100° C., for example). Consequently, if the temperature of the miniature motor is increased as a result of the continuous application of an overload to the miniature motor, or the flow of an overcurrent when the rotation of the rotor is forcibly locked, the internal resistance of the positive temperature coefficient resistor 44 sharply increases, rapidly reducing the value of current fed to the miniature motor to prevent the miniature motor from being overheated.

In the construction shown in FIGS. 2 and 3 above, the force pushing the brush arm 39 tends to be insufficient, lowering the reliability of electrical connection, because the elastic force imparted to the internal terminal 41 is relatively small. Furthermore, the work of assembling the internal terminals 41 into the case cover 33 is troublesome, resulting in low workability and productivity.

When inserting the external power feeding terminals 43 into the internal terminals 41, there is a possibility that the internal terminal 41 unwantedly moves in the direction orthogonally intersecting the end face of the case cover 33, depending on the method of inserting the external power feeding terminals 43. This could result in an interruption of power fed to the miniature motor, or lowered motor characteristics.

In the construction incorporating the positive temperature coefficient resistor 44, as shown in FIG. 3, pairs of the brush arms 39 and the internal terminals 41, which are the same components in terms of functionality, must be made in entirely different shapes and sizes for right-hand and left-hand ones because of the presence of the positive temperature coefficient resistor 44. This leads to a decrease in the number of common parts, and an increase in the number of parts, and therefore results in difficulty in parts control.

SUMMARY OF THE INVENTION

This invention is intended to overcome the problems inherent in the prior art. It is an object of this invention to provide a miniature motor which has high reliability in electrical connections, improves workability, enables parts to be standardized.

BRIEF DESCRIPTION OF THE DRAWINGS

FIG. 1 is a partially cross-sectional side view illustrating an example of miniature motor to which this invention is applied.

FIG. 2 is an inside end view showing an example of the case cover in FIG. 1.

DETAILED DESCRIPTION OF THE EMBODIMENT

Figure 3:
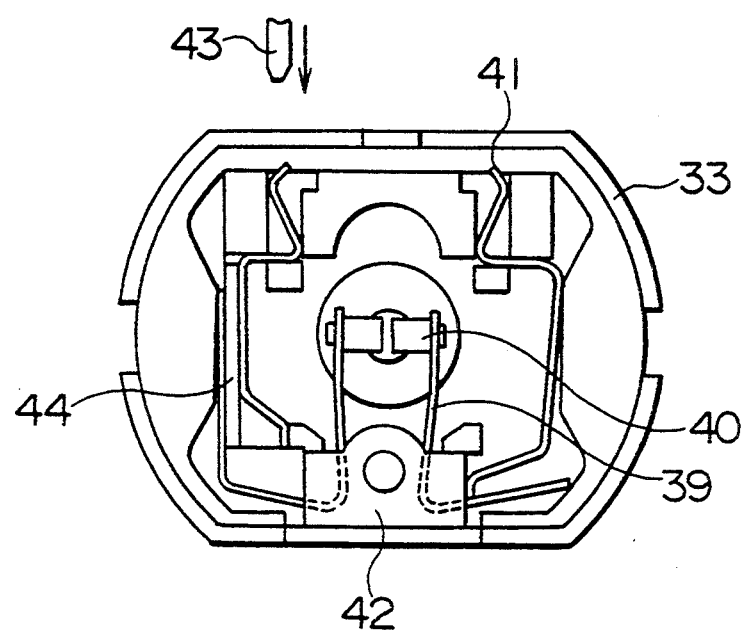
FIG. 3 is an inside end view showing another example of the case cover in FIG. 1.
Figure 4:
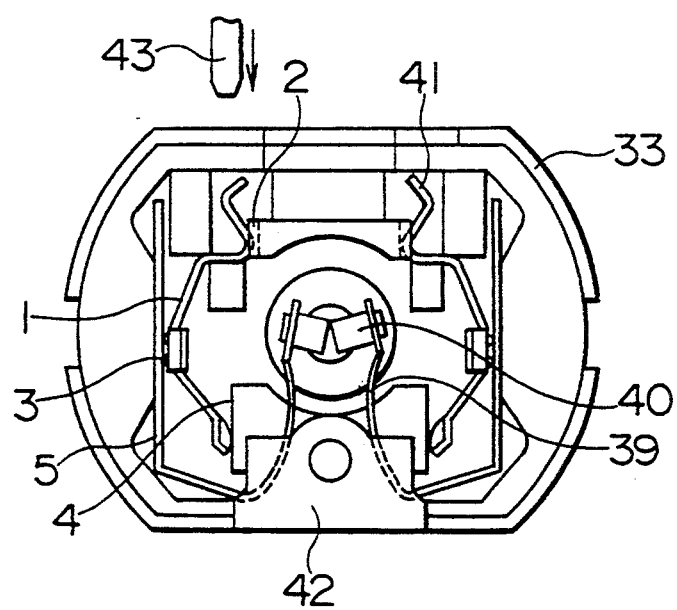
FIGS. 4 and 5 are an inside end view and a partially cross-sectional side view, respectively, illustrating a case cover in an embodiment of this invention.
Figure 5:
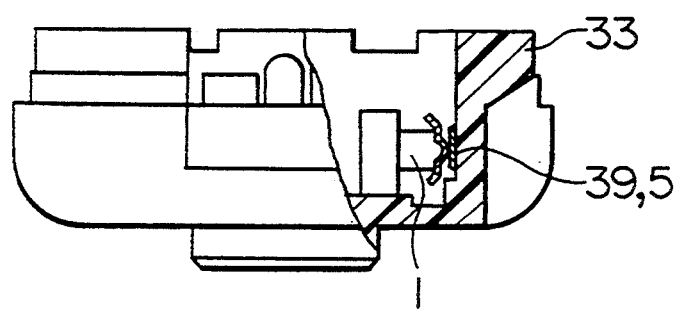

FIGS. 4 and 5 are an inside end view and a partially cross-sectional side view, respectively, illustrating a case cover in an embodiment of this invention. Like parts are indicated by like numerals used in FIGS. 2 and 3. In FIGS. 4 and 5, the brush arm 39 is made of an electrically conductive material, such as copper or copper alloy, and formed into an essentially U shape, with a brush 40 fixedly fitted to the free end of one leg of the essentially U-shaped brush arm 39, the other leg thereof being formed into an essentially plate-shaped connecting part 5 extending along the inside end face of the case cover 33, with the free end thereof disposed in the vicinity of the internal terminal 41. The brush arm 39 is fitted to the case cover 33 via a holder 42.

The internal terminal 41 is made of an electrically conductive material similar to that of the brush arm 39, and the part thereof extending to the inside of the case cover 33 is formed into an essentially V-shaped connecting part 1. Numeral 2 refers to an engaging groove provided in the vicinity of a part of the case cover 33 where an external power feeding terminal 43 is inserted in the direction along the end face of the case cover 33, and the width of the engaging groove 2 is formed into a size slightly larger than the width of the internal terminal 41, and the depth thereof into a size corresponding to the thickness of the internal terminal 41. Numeral 3 refers to a projection; two projections 3, for example, provided on the side of the connecting part 1 where the connecting part 1 comes in contact with the brush arm 39.

With the aforementioned construction, the connecting part 1 of the internal terminal 41 is fitted between the engaging groove 2 and an engaging part 4 provided on the case cover 33 and a connecting part 5 of the brush arm 39 in an elastically deformed state. As a result, the connecting part 1 pushes the connecting part 5 of the brush arm 39 outward, an electrical connection between the internal terminal 41 and the brush arm 39 can be maintained. By providing the projection 3 on the connecting part 1, the aforementioned electrical connection can be further improved.

Since an area near the end of the internal terminal 41 facing the external power feeding terminal 43 is fitted into the engaging groove 2 provided on the case cover 33, the movement of the internal terminal 41 is restricted even if a force orthogonally intersecting the end face of the case cover 33, for example, is exerted when inserting or extracting the external power feeding terminal 43, for example. As a result, the displacement of the internal terminal 41, as is found with the prior art, can be prevented.

Figure 6:
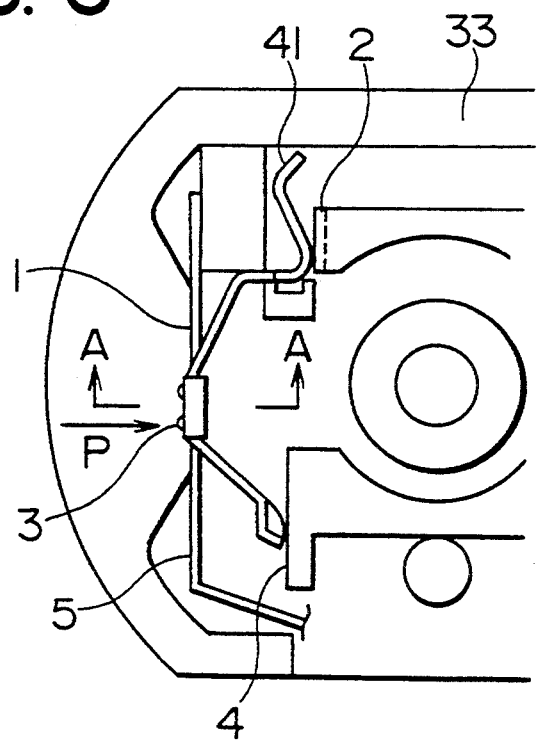
FIG. 6 is an enlarged end view illustrating the state where the internal terminal 41 is assembled into the case cover 33.
Figure 7:
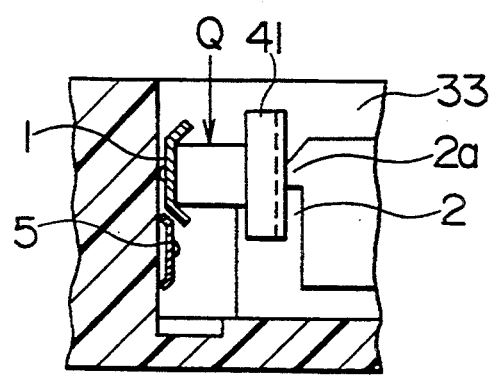
FIG. 7 is a cross-sectional view taken along line A—A in FIG. 6.
Figure 8:
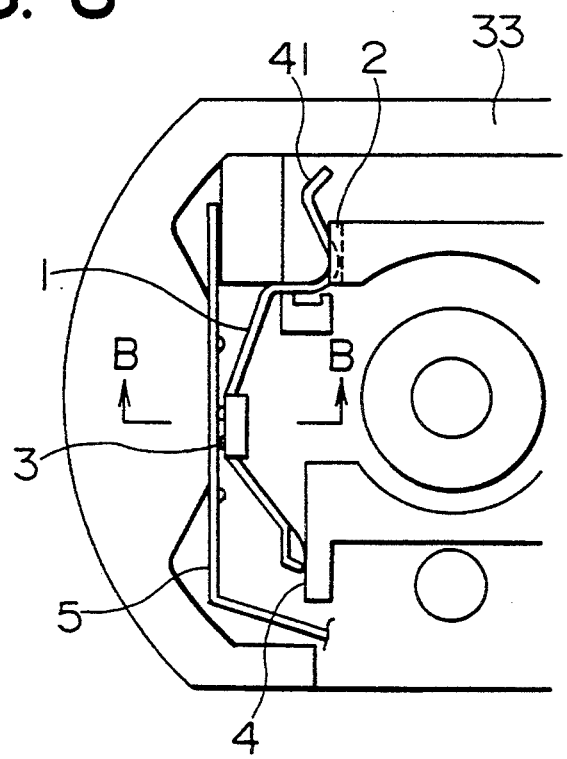
FIG. 8 is an enlarged end view illustrating the state where the internal terminal 41 has been assembled into the case cover 33.
Figure 9:
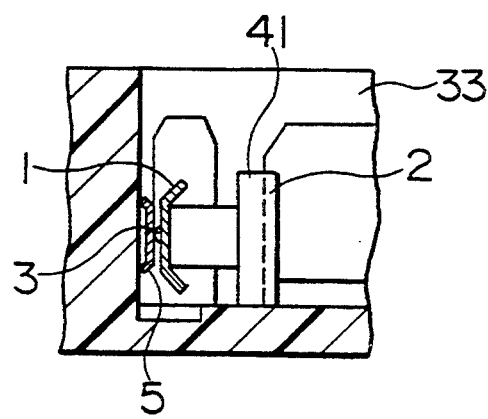
FIG. 9 is a cross-sectional view taken along line B—B in FIG. 8.

FIG. 6 is an enlarged end view illustrating the state where the internal terminal 41 is assembled into the case cover 33. FIG. 7 is a cross-sectional view taken along line A—A in FIG. 6. FIG. 8 is an enlarged end view illustrating the state where the internal terminal 41 has been assembled into the case cover 33. FIG. 9 is a cross-sectional view taken along line B—B in FIG. 8. Like parts are indicated by like numerals used in FIGS. 4 and 5.

As shown in FIGS. 6 and 7, the internal terminal 41 is set to a predetermined position on the inner end face of the case cover 33, the V-shaped connecting part 1 is caused to be elastically deformed by applying a force in the direction shown by arrow P, and then the internal terminal 41 is inserted in the case cover 33 by applying a force in the direction shown by arrow Q. This causes the free end of the connecting part 1 to move downward while sliding on the engaging part 4 and the edge 2a of the engaging groove 2. When the connecting part 1 arrives at a predetermined position, the area near the end facing the external power feeding terminal (not shown) of the internal terminal 41 is engaged with the engaging groove 2, as shown in FIGS. 8 and 9. Thus, the internal terminal 41 is prevented from being moved in the direction orthogonally intersecting the end face of the case cover 33, that is, prevented from being loosened and fallen. In this case, the amount of elastic deformation imparted to the connecting part 1 may be determined appropriately, taking into consideration the pushing force necessary to be maintained between the connecting parts 1 and 5.

Figure 10:
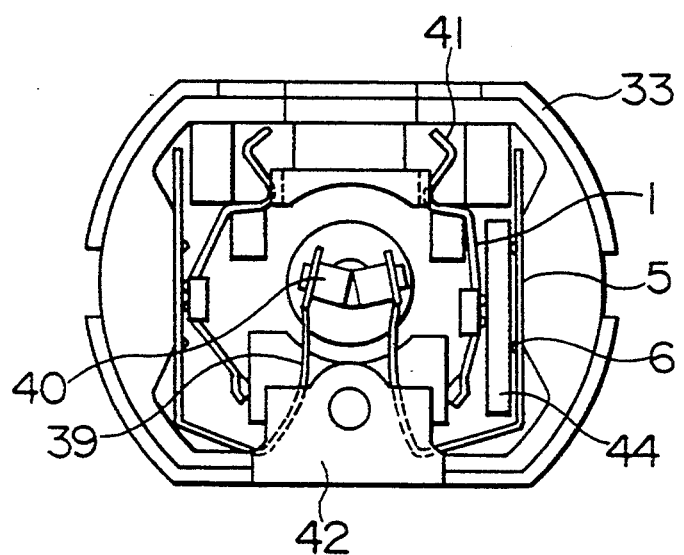
FIGS. 10 and 11 are an inside end view and a partially cross-sectional side view, respectively, illustrating a case cover 33 in another embodiment of this invention.
Figure 11:
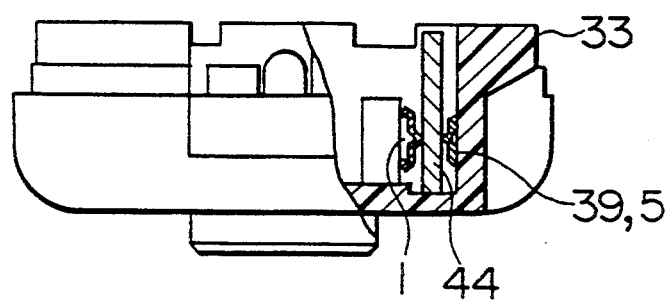

FIGS. 10 and 11 are an inner end view and a partially cross-sectional side view, respectively, illustrating a case cover in another embodiment of this invention. Like parts are indicated by like numerals in FIGS. 3 through 5. The embodiment shown in FIGS. 10 and 11 is a miniature motor in which a plate-shaped positive temperature coefficient resistor 44 is interposed between the connecting part 1 of the internal terminal 41 and the connecting part 5 of the brush arm 39.

In this case, it is desirable, in making electrical connections more positive, to provide a projection 6 on the side of the connecting part 5 of the brush arm 39 where the connecting part 5 comes in contact with the positive temperature coefficient resistor 44. The shape and size of the connecting part 1 correspond to the thickness of the positive temperature coefficient resistor 44 to be interposed, though the connect part 1 is slightly different from that shown in FIGS. 4 and 5. This allows the connecting part 1 to be manufactured using a molding die for manufacturing the connecting part 1 of FIGS. 4 and 5 by merely changing a part thereof, and the materials of essentially the same size to be used.

This invention having the aforementioned construction and operation can accomplish the following effects.

(1) Reliability in electrical connection between the connecting part of the internal terminal and the brush arm can be substantially improved by fitting the connecting part in the case cover in elastically deformed state.

(2) Since electrical connection can be effected and the internal terminal can be held in position merely by engaging the end of the internal terminal to the engaging groove provided on the case cover, assembly work is facilitated, leading to improved productivity.

(3) Miniature motors, whether or not equipped with a positive temperature coefficient resistor, can be manufactured with essentially the same component mix, enabling cost reduction through the standardization of components,

What is claimed is:

1. A miniature motor, comprising:
   a case formed into a bottomed hollow tubular shape;
   a permanent magnet fixedly fitted to an inner circumferential surface of said case;
   a rotor formed of an armature and a commutator, said rotor being positioned within said case;
   a case cover engaged with an open end of said case, said case cover having an engaging part and having external power feeding terminal receiving regions each with an engaging groove;

internal terminals each of said internal terminals extending into a corresponding one of said external power feeding terminal receiving portions;

brush arms, each of said brush arms being connected to a corresponding one of said input terminals, each of said brush arms being formed into an essentially U-shape with a first free end having a brush and a second free end fitted to said case cover adjacent to one of said input terminals, each of said internal terminals having an essentially V-shape and being positioned within said case cover and fitted to said case cover in an elastically deformed state, each of said internal terminals including a contacting part in contact with said engaging part of said case cover, a connecting part in contact with said brush arm and an engaging part engaged in said engaging groove, said connecting part having projections provided on a side of said internal terminal facing said brush arm, whereby said engaging groove and fitting said input terminals in said elastically deformed state restricts movement of said internal terminal in a direction orthoganally intersecting an end face of said case cover.

2. A miniature motor as set forth in claim 1 wherein a positive temperature coefficient resistor for controlling electric current flowing in an armature winding is interposed between said internal terminal connecting part and said brush arm connecting part.

3. A miniature motor, comprising:
a case formed into a bottomed hollow tubular shape;
a permanent magnet fixedly fitted to an inner circumferential surface of said case;
a rotor formed of an armature and a commutator, said rotor being positioned within said case;
a case cover engaged with an open end of said case, said case cover having an engaging part and having external power feeding terminal receiving regions, each receiving region having a engaging groove;
internal terminals each of said terminals extending into a corresponding one of said receiving portions;
brush arms, each of said brush arms being connected to a corresponding one of said input terminals, each of said brush arms being formed into an essentially U-shape with a first free end having a brush and a second free end fitted to said case cover adjacent to one of said input terminals, each of said internal terminals having an essentially V-shape and being positioned within said case cover and fitted to said case cover in an elastically deformed state, each of said internal terminals including an end with a contacting part in contact with said engaging part of said case cover, a connecting part in contact with said brush arm and an end with an engaging part engaged in said engaging groove, said connecting part being provided between ends of said internal terminal and having projections provided on a side of said internal terminal facing said brush arm, said engaging groove and fitting said input terminals in said elastically deformed state cooperating to provide restricting means for restricting movement of said internal terminal in a direction orthoganally intersecting an end face of said case cover.

4. A miniature motor as set forth in claim 3 wherein a positive temperature coefficient resistor for controlling electric current flowing in an armature winding is interposed between said internal terminal connecting part and said brush arm connecting part.

* * * * *